Figure 1:
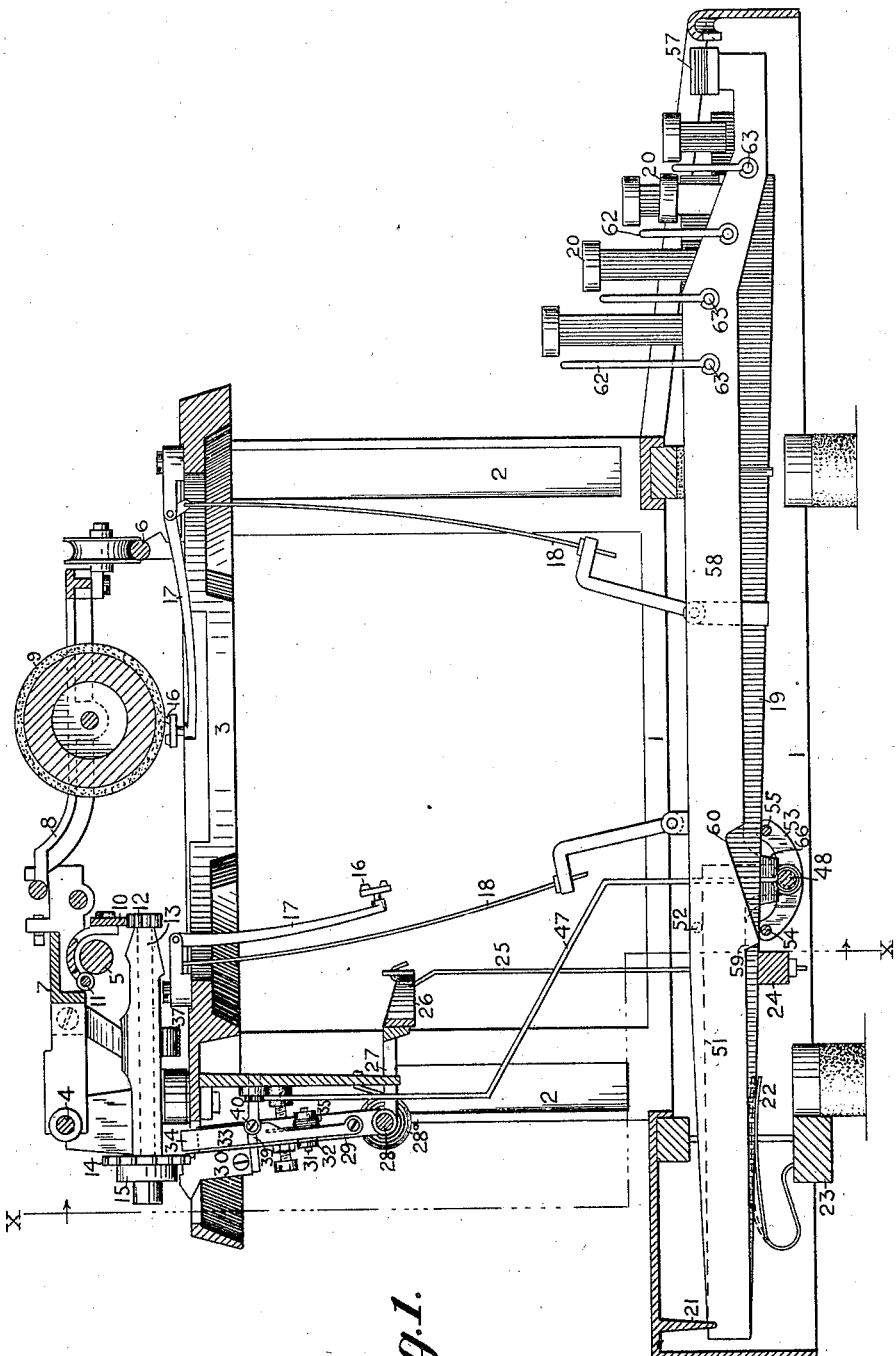

No. 679,360. Patented July 30, 1901.
B. A. BROOKS.
TYPE WRITING MACHINE.
(Application filed Apr. 20, 1900.)
(No Model.) 5 Sheets—Sheet 1.

WITNESSES:
E. M. Wells
K. V. Donovan.

INVENTOR
Byron A Brooks
by Jacob Felbel
HIS ATTORNEY

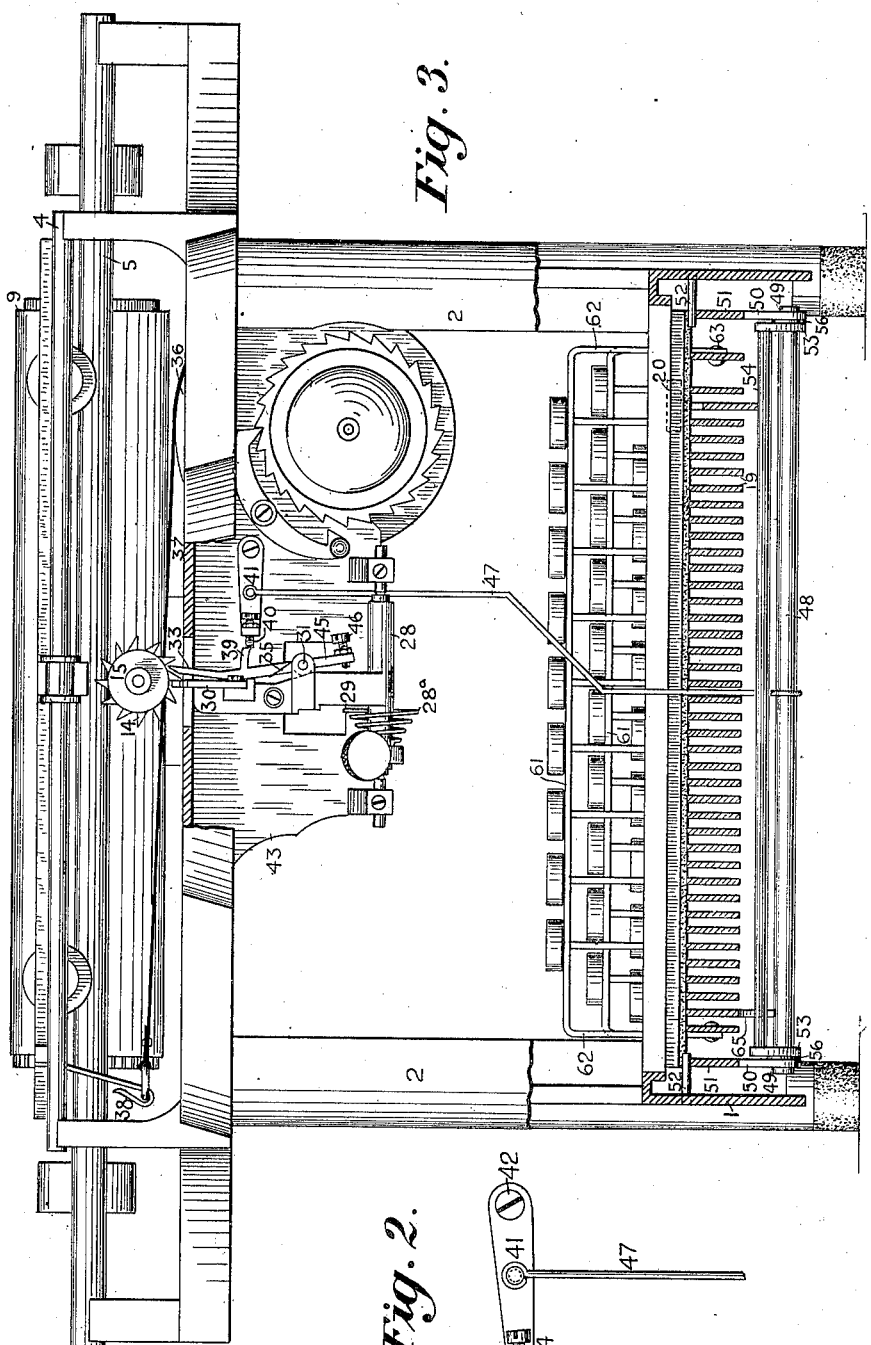

No. 679,360. Patented July 30, 1901.
B. A. BROOKS.
TYPE WRITING MACHINE.
(Application filed Apr. 20, 1900.)
(No Model.) 5 Sheets—Sheet 3.

WITNESSES:
E. W. Wells
K. V. Donovan

INVENTOR
Byron A. Brooks
by Jacob Felbel
HIS ATTORNEY

No. 679,360. Patented July 30, 1901.
B. A. BROOKS.
TYPE WRITING MACHINE.
(Application filed Apr. 20, 1900.)
(No Model.) 5 Sheets—Sheet 4.

WITNESSES:
E. M. Hells
K. V. Donovan

INVENTOR
Byron A. Brooks
by Jacob Felbel
HIS ATTORNEY

THE NORRIS PETERS CO., PHOTO-LITHO., WASHINGTON, D. C.

No. 679,360. Patented July 30, 1901.
B. A. BROOKS.
TYPE WRITING MACHINE.
(Application filed Apr. 20, 1900.)

(No Model.) 5 Sheets—Sheet 5.

WITNESSES:
E. W. Nells
K. V. Donovan.

INVENTOR:
Byron A. Brooks
by Jacob Felbel
HIS ATTORNEY.

UNITED STATES PATENT OFFICE.

BYRON A. BROOKS, OF BROOKLYN, NEW YORK, ASSIGNOR TO UNION TYPE-WRITER COMPANY, OF JERSEY CITY, NEW JERSEY.

TYPE-WRITING MACHINE.

SPECIFICATION forming part of Letters Patent No. 679,360, dated July 30, 1901.

Application filed April 20, 1900. Serial No. 13,608. (No model.)

*To all whom it may concern:*

Be it known that I, BYRON A. BROOKS, a citizen of the United States, and a resident of the borough of Brooklyn, city of New York, in the county of Kings and State of New York, have invented certain new and useful Improvements in Type-Writing Machines, of which the following is a specification.

My invention relates to the letter-spacing mechanism of type-writing machines. It is customary to make the space between words by a separate finger-stroke, which takes the same amount of time as is required for the operation of a type-key, and as spaces occur frequently the aggregate time consumed in operating the space-key is very great, amounting to perhaps thirty per cent. of the total time used in operating the keyboard.

The object of my invention is to enable the operator at will to feed the paper-carriage a double space at the operation of any type-key and to effect this result by the same finger-stroke that operates the type-key, thus avoiding confusion and enabling the spacing between words to be accomplished automatically without the necessity of a complex mental act on the part of the operator.

In carrying out my invention I have organized the mechanism so that when either a type-key or the space-key frame is operated alone the paper-carriage moves a single letter-space, but when both are operated together the carriage moves a double letter-space, so that the writing of the next word may be begun without loss of time. I have also provided a series of auxiliary transverse bars, one behind each bank of keys, so that by projecting the finger rearwardly to a slight extent when depressing a key the said finger will strike one of said bars and cause the double-spacing mechanism to operate. The dip of the keys is not altered. The operation of the double-spacing mechanism requires no perceptible power, and the construction and arrangement are such that the machine may be used either as an automatic spacer or not, as desired, so that an operator accustomed to the operation of the double-spacing mechanism may use it in that way, while at any time an operator unaccustomed thereto may use the machine in the ordinary way. In connection with the usual single space-key I have also provided an auxiliary space-key, which may be operated at any time to cause the carriage to feed two spaces independently of the operation of any other key. This two-space key will be found useful in writing headings and in various other classes of work.

In carrying out these several novel features of invention I have provided, in addition to the universal bar, a special rocking frame, which is operated by the keys and is connected to the letter-spacing mechanism of the carriage. This frame rocks idly when either character or space key is depressed alone; but when both are depressed together it moves bodily downwardly and through its connections causes a double feed of the carriage.

My invention also consists in certain other features of construction and combinations of devices, all as will be hereinafter more fully set forth, and particularly pointed out in the appended claims.

Figure 4:
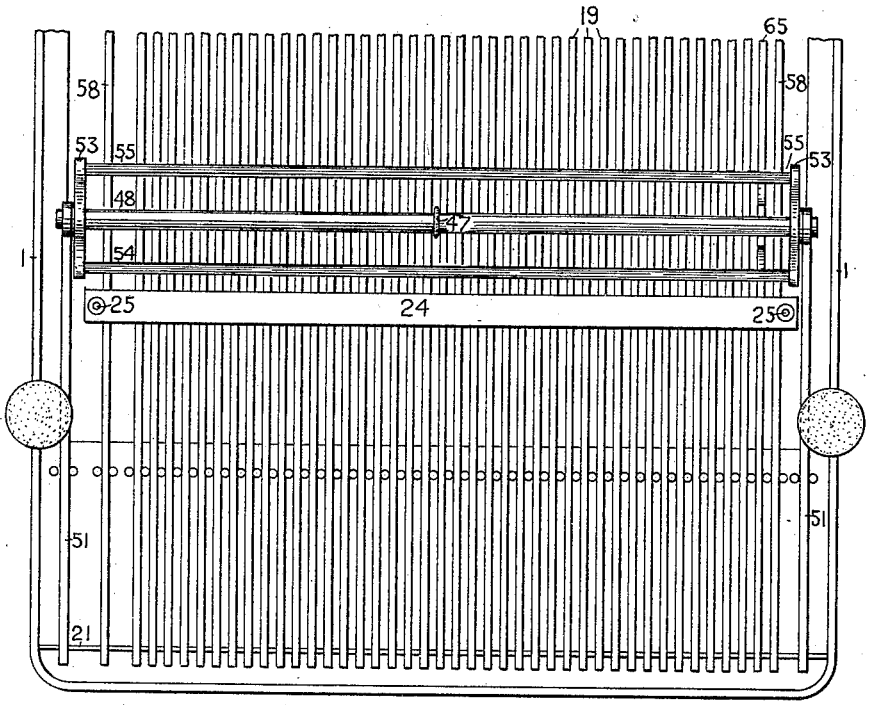
Figure 5:
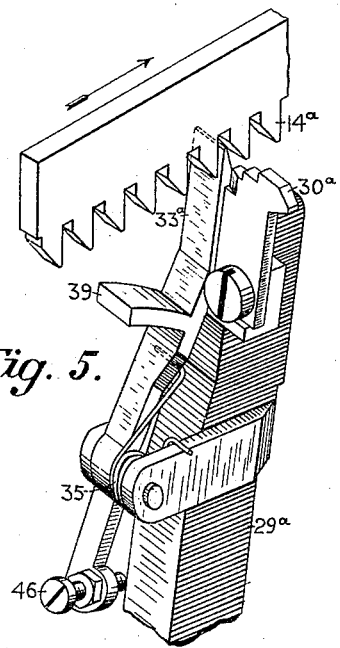
Figure 6:
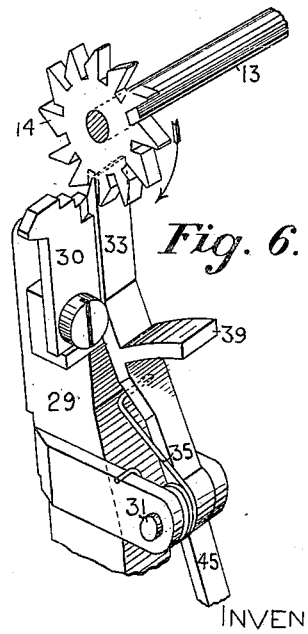
Figure 7:
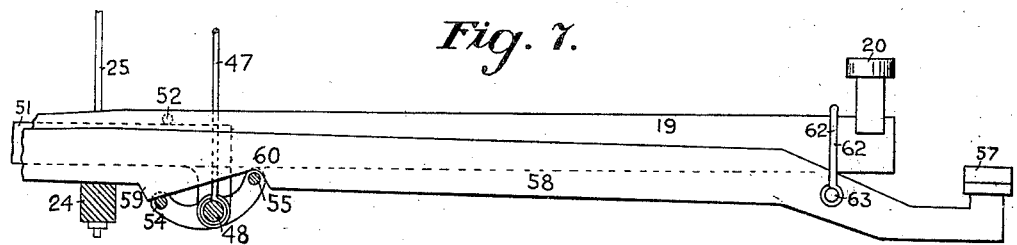
Figure 8:
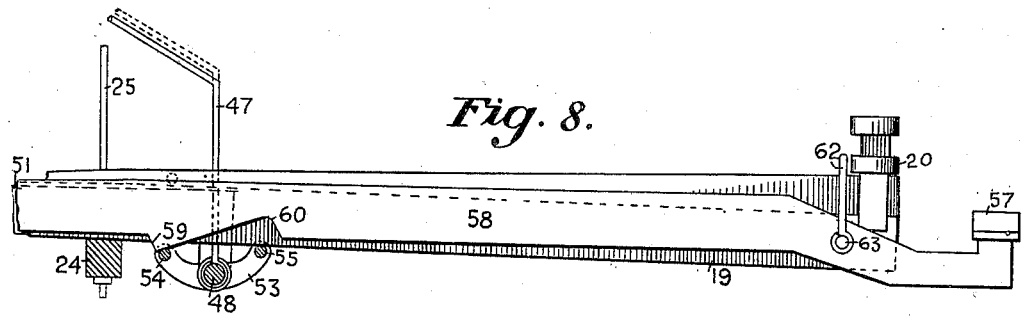
Figures 9, 11:
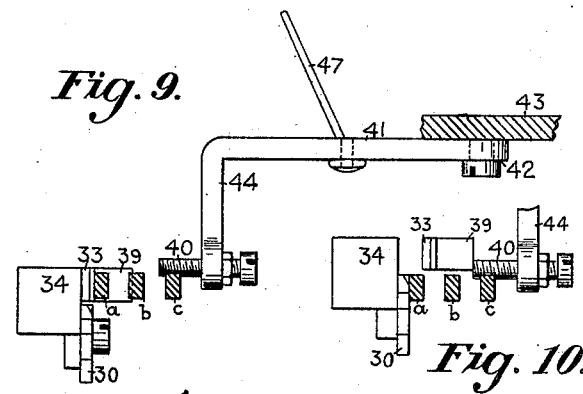
Figure 10:
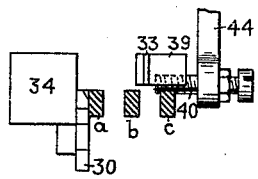
Figure 12:
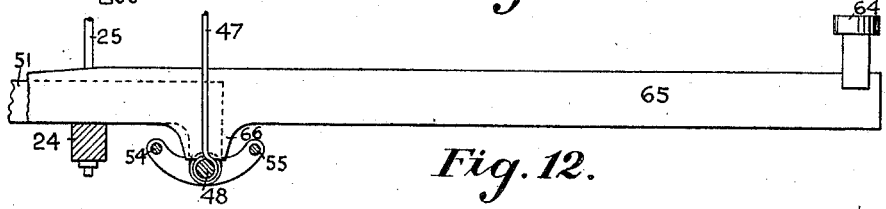
Figure 13:
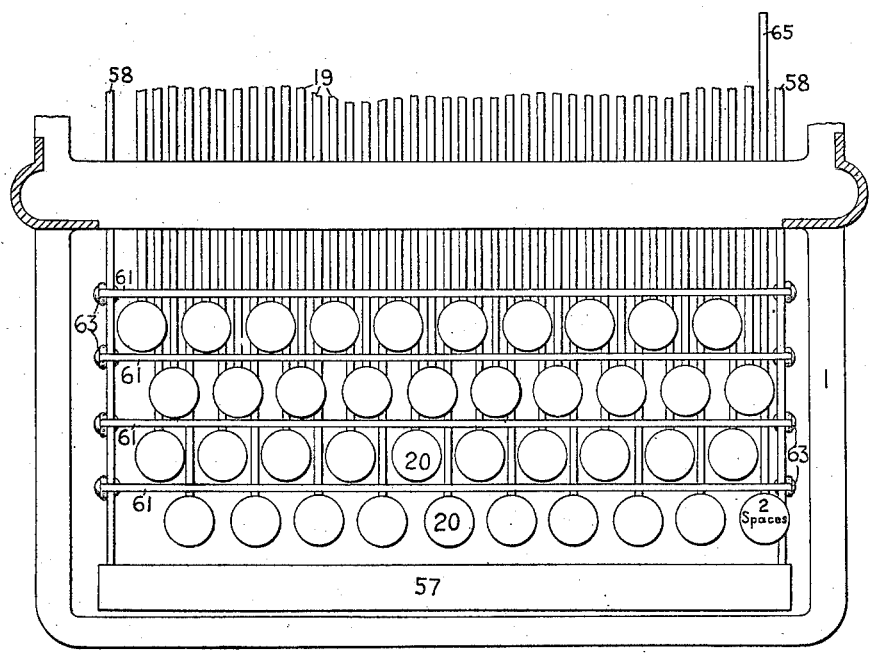

In the accompanying drawings, Figure 1 is a longitudinal vertical section of a Remington No. 6 type-writing machine embodying my improvements. Fig. 2 is an enlarged fragmentary rear view of a portion of the escapement mechanism, showing the method of securing a double feed of the carriage. Fig. 3 is a rear vertical section taken on the line X X of Fig. 1. Fig. 4 is a bottom plan view of the rear portion of the machine, showing the key-levers, universal bar, and rocking frame. Fig. 5 is a perspective view of a modification of some of the escapement devices. Fig. 6 is an enlarged perspective view of a portion of the escapement devices. Fig. 7 is a diagrammatic view showing the position assumed by the parts upon the depression of the usual space-key. Fig. 8 is a diagrammatic view showing the position of the parts upon the depression of both a type-key and the space-key. Figs. 9, 10, and 11 are diagrammatic plan views of some of the escapement devices, showing, respectively, normal position, single-feed position, and double-feed position of the escapement-dogs. Fig. 12 is a side view of the two-space key. Fig. 13 is a top plan of the keyboard.

Throughout the various views the same parts are designated by the same numerals of reference.

The frame of the machine comprises a rectangular base 1, corner-posts 2, rising therefrom, and a top plate or type-ring 3, secured upon the corner-posts. A paper-carriage slides upon rails 4, 5, and 6, suitably supported upon the top plate, and comprises a frame 7, having a sliding movement only, and also a platen-frame 8, pivotally connected to frame 7, the cylindrical platen carried by said platen-frame being designated as 9. A letter-spacing rack 10 is pivotally secured to the carriage at 11 and is arranged in mesh with a pinion 12, secured upon the front end of a horizontal shaft 13, upon the rear end of which is mounted an escapement-wheel 14, connected to said shaft by means of a backing ratchet arranged within a housing 15. The types 16 are secured upon the free ends of type-bars 17, which are connected by adjustable links 18 to a series of horizontal levers 19, provided at their forward ends with keys 20 and notched at their rear ends to engage the lower edge of a rib 21, cast integrally with the base. The key-levers are pressed up against said rib by means of springs 22, secured in a cross-bar 23. A universal bar 24 extends transversely beneath all the key-levers, and by means of hooks 25, one rising from each end of said universal bar, is connected to a cross-bar 26 of a vibratory frame or dog-rocker, the latter comprising a horizontal arm 27, a journaled shaft 28, and an upright arm 29. A returning-spring 28$^a$ is provided for the dog-rocker. The parts just described may all be found in the Remington No. 6 type-writing machine.

Rigidly secured upon the upper end of the vibratory arm 29 is a detent-dog 30, and pivotally secured at 31 to ears 32, provided upon said arm 29, is a stepping or feeding dog 33, which is normally in engagement with the escapement-wheel 14, being pressed thereby against an abutment 34, provided upon the upper end of said vibrating arm 29. Normally said dog 33 is in line with the detent-dog 30, as illustrated at Fig. 9. A spring 35, which is coiled around the pivot-pin 31, presses upon said dog 33 and causes the latter when released from the control of the escapement-wheel to vibrate about said pivot 31 in a direction opposite to the movement of the escapement-wheel, so that upon the return of the vibrating arm 29 to normal position the said feeding-dog will engage another tooth of the escapement-wheel, and thereby permit the movement of the carriage under the tension of the spring-drum 36, which, as usual, is connected to the carriage by a strap 37 and a hook 38. Said feeding-dog is provided with a lateral projection 39, which at the ordinary operation of the mechanism contacts with an adjustable screw-stop 40, carried by a lever 41, which is pivoted at 42 to the usual vertical plate 43, secured to the under side of the top plate 3. This lever 41 extends parallel with said plate 43 and at its free end is provided with an offset arm 44, in which said adjustable screw-stop 40 is mounted. The escapement-dog 33 is provided below its pivot 31 with an extension 45, in the lower end of which is secured an adjustable screw-stop 46, which is idle during the usual operation of the escapement mechanism, but which when the lever 41 is moved to an inoperative position serves to arrest the escapement-dog 33 after it has vibrated past two teeth of the escapement-wheel under the tension of the spring 35. The said stop-lever 41 is connected by a bent vertical link 47 to a transverse shaft 48, arranged a short distance beneath the series of key-levers and rigidly secured at its ends at 49 in ears 50, depending from the forward free ends of short levers 51, the rear ends of which levers are notched and engage the rib 21 in the same manner as the key-levers. Said levers 51 are supported by springs 22 in the same manner as the key-levers. The forward ends of said arms 51 normally bear up against horizontal pins 52, projecting inwardly from the side walls of the base. The frame comprising the levers 51 and the shaft or bar 48 may be vibrated downwardly about the pivotal point 21, thereby through the rod 47 pulling down the lever 41 and removing the screw-stop 40 thereon from the path of the projection 39 upon the spacing-dog 33. Journaled upon said shaft 48 near its ends is an idle frame, comprising a pair of levers or cross-bars 53, which are rigidly connected by a pair of cylindrical bars or tie-rods 54 55, the former rod being arranged in rear of the shaft 48 and the latter forwardly thereof, and both rods being parallel with said shaft. The levers 53 and the tie-rods 54 55, taken together, form a rigid frame which may rock idly upon the shaft 48 and is prevented from endwise movement thereon by means of washers 56, placed upon said shaft 48 between the levers 53 and the ears 50. It will be observed that the pivoted spring-pressed frame composed of the shaft 48 and the levers 51 constitutes a movable support for the idle frame.

A space-key bar 57 is arranged horizontally in front of the type-keys and rigidly secured to a pair of levers 58, which extend rearwardly parallel with the type-key levers and are likewise notched to engage the rib 21 and also provided with lifting-springs 22. At a point just over the rear tie-rod 54 said space-key levers are each provided with a projection 59, adapted to engage said tie-rod upon the depression of the space-key. At a point over the forward tie-rod 55 each of said space-keys is notched or cut away at 60, so as to form a clearance for the front tie-rod 55. The said space-key levers 58 are likewise united by a series of inverted-U frames, each comprising a horizontal rod 61 and vertical stems 62, the lower ends of the latter being riveted at 63 to the space-key levers 58. Each U-frame is preferably formed from a single piece of wire.

The U-frames are four in number, corresponding to the four banks of keys, and each is arranged just behind one of the banks, the stems 62 in each case being of sufficient length to compensate for the different heights of the banks, so that the horizontal bar 61 lies in a plane just below the tops of the keys in the bank with which it is associated, so that, if desired, any type-key may be depressed alone or the bar 61 in rear of said key may be simultaneously operated.

It will be noted that the banks of keys are arranged in their usual order and that the keys are separated or spaced to the usual extent, both between different banks and between different keys in the same bank.

The ordinary operation of a type-key is illustrated at Figs. 1 and 3, in which it will be observed that the depressed key-lever 19 has caused the type-bar 17 to swing up to the platen and the universal bar 24 to be depressed, thereby pulling down the arms 26 27 of the dog-rocker and causing the upright arm 29 thereof to swing forwardly, disengaging the dog 33 from the escapement-wheel and allowing said dog to swing under the influence of the spring 35 until the projection 39 upon said dog contacts with the screw-stop 40, at which time the said dog stands in register with the next notch of the escapement-wheel. At the said depression of the key-lever 19 it has engaged the forward tie-rod 55 and moved the latter downwardly, causing the levers or bars 53 to turn idly upon the shaft 48, in which position it remains during the subsequent similar operation of the type-keys. The shaft 48 has not, however, been moved, at least not enough to cause the screw-stop 40 to move to an inoperative position. Upon the release of the key the key-lever and type-bar return to normal position, as well as the universal bar and connected parts, the dog 33 entering the fixed notch in the escapement-wheel and permitting the carriage to advance one space under the influence of the spring-drum 36. Thus it will be seen that the operation of the type-keys in the usual manner causes the usual single-letter-spacing feed of the carriage.

At the usual operation of the space-key the universal bar is likewise moved to cause the letter-spacing devices to act, as indicated at Fig. 7. The projections 59 upon the space-key levers 58 contact with the rear tie-rod 54 of the horizontal rocking frame and cause said frame to rock idly about the shaft 48, the notch 60 affording a clearance for the upward movement of the front tie-rod 55, so that there is no movement at this time of the shaft 48, and hence the carriage moves only the usual single-letter-space distance. The downward movement of the space-key may be limited by the usual stops. (Not shown.)

Upon the simultaneous depression of a type-key and the space-key the universal bar 24 is operated, as usual. The projections 59 upon the space-key levers 58 engage the rear tie-rod 54 of the idle frame, while the front tie-rod 55 is simultaneously engaged by the depressed type-key, thus preventing the vibration of the levers 53 upon the rod 48, so that at this time the entire mechanism, including the rods 54 55, the levers 53, the rod 48, the levers 51, and the vertical connecting-rod 47, are carried bodily down, causing the stop-lever 41 to be swung downwardly to an inoperative position and permitting the feeding-dog to be swung by its spring to a point in register with the next notch, but one in the escapement-wheel, as illustrated at Figs. 2 and 8. Upon the release of the type-key and space-key from pressure the universal bar returns to normal position under the influence of the spring $28^a$, and the feeding-dog enters the second notch in the escapement-wheel, thereby permitting the carriage to be advanced two letter-spaces, so that a space is left upon the paper between the impression just made and the succeeding type-impression, whereby the time required for operating the space-key separately is saved.

Referring more particularly to Figs. 9, 10, and 11, it will be observed that at Fig. 9 the parts are represented in normal position, the tooth $a$ of the escapement-wheel engaging the spacing-dog 33 and pressing it against the abutment 34. At Fig. 10 is illustrated the position taken by the parts at the depression of either a type-key or the space-key, the dog-rocker having been vibrated rearwardly and the spacing-dog being shown as disengaged from the tooth $a$ and the projection 39 thereon being in contact with the screw-stop 40, said stop having arrested the dog when opposite the notch between the teeth $a$ and $b$ of the escapement-wheel, so that upon relief of the key from pressure and return of the dog-rocker to normal position the said feeding-dog will enter said notch and permit an advance movement of the carriage for a single letter-space. At Fig. 11 is illustrated the position taken by the parts when a type-key and the space-key are depressed simultaneously, the screw-top 40 having been moved downwardly out of the path of the projection 39 on the feeding-dog 33 and the latter having consequently vibrated sidewise under the tension of the spring 35 until arrested by the contact of the screw-stop 46 with the side of the upright arm 29 of the dog-rocker, at which time the said dog is in alinement with the notch between the teeth $b$ and $c$ of the escapement-wheel. Upon the relief of the type-key and space-key from pressure the dog 33 enters the said notch, and therefore permits the advance movement of the carriage a double letter-space.

Referring to Figs. 3, 4, 10, and 13, it will be seen that I have provided at the keyboard an auxiliary two-space key 64, which is secured to a special lever 65, extending parallel with the type-key levers and notched at its rear end to engage the rib 21 and likewise provided with a lifting-spring 22. At a point just over the shaft 48 said lever 65 is provided with a downwardly-extending projection 66, which at the operation of the key engages said shaft 48 and moves it downwardly, together with the bent link 47, thereby causing the stop-lever 41 to move to an inoperative position. The universal bar 24 is also operated by said key 65 and at the consequent operation of the dog-rocker and release of the feeding-dog from the escapement-wheel the said feeding-dog is enabled to vibrate to the position indicated at Fig. 2, thereby permitting a double feed of the carriage under the influence of the spring-drum. This key 64 will be found very useful in connection with the single-spacing key 57, enabling either one or two spaces to be secured, as desired.

Referring now to the modification shown at Fig. 5, it will be observed that in place of the curved escapement-rack 14 a straight rack 14$^a$ is employed, which moves in the same direction as the paper-carriage, the detent-dog 30$^a$ being accordingly placed upon the opposite side of the upright arm 29$^a$ of the dog-rocker and the feeding-dog 33$^a$ being correspondingly pivoted and spring-pressed, it being understood that the independent movement of said feed-dog must be in a direction opposite to the movement of the rack.

From the foregoing it will be seen that the type-keys may be operated freely to cause their respective types to print, and that spaces between words may be obtained automatically by causing the finger when operating the last type-key in a word to project a little over the rear edge of the key, so as to engage the corresponding cross-bar 61 and cause a depression thereof simultaneously with the type-key. The opposition offered by the cross-bar 61 in being depressed is very slight and causes no inconvenience to the operator. Upon becoming accustomed to project the finger rearwardly in the manner described when striking the last letter of a word the operator is enabled to save considerable time in the operation of the keyboard and also to avoid the fatigue heretofore occasioned by separate operation of the space-key. It will further be observed that, if desired, the operator may, instead of striking the cross-bar 61, become accustomed to tapping the space-key 57 simultaneously with the last letter of a word, although I deem the other method preferable.

The frame which is pivoted upon the shaft 48 rocks idly during the separate operation of either type-key or single-space key and offers no appreciable resistance to the touch. At the operation of the first key in a word this idle frame rocks to the position shown at Fig. 1 and remains in that position until a type-key and space-key are simultaneously depressed, so that no movement of said idle frame occurs after the operation of the first key in a word until the final letter in that word is reached. Hence the opposition offered by said idle frame to the operation of the keys is so insignificant that it may be disregarded.

It will further be observed that the entire mechanism is positive in operation, the stop-lever 41 being positively moved to an inoperative position at the simultaneous operation of the type-key and the space-key frame and being promptly returned to normal position at the relief of said keys from pressure, so that it is possible to operate the machine at the highest speed without danger of clashing or faulty action of the parts. It will further be observed that the mechanism is of the simplest character and readily adapted to machines now in use and is not likely to get out of order or to require repairs. Should an operator who is not accustomed to the use of a double-spacing mechanism desire to use the machine, he may operate the type-keys and the space-key in the usual manner and at any desired speed without difficulty and without liability of any of the parts to irregular action, as it will be borne in mind that the double-spacing mechanism is inoperative during the single operation of any type-key or space-key. Moreover, an operator may begin by using the machine in the ordinary way and gradually accustom himself to projecting the finger rearwardly at the operation of the final type-key in a word, so as to cause the automatic double-spacing action, and in due time become so expert as to be enabled to dispense with the use of the key-bar 57 for ordinary word-spacing, with resulting increase in speed.

It will also be observed that the movement of the dog-rocker 29 is the same at all times, whether single or double spacing is being effected, and that therefore said rocker returns promptly to normal position at the double-spacing operation, enabling the first letter of the next word to be struck at once. The two-space key 64 may be used in making extra spaces between sentences and also in making headings and in various kinds of tabular work, &c. It is useful also when it is desired to move the carriage a few spaces at the beginning of a line, so as to indent a paragraph or heading, as by the use of this key the carriage may be spaced along in half the time and with half the labor required for the use of the ordinary space-key. If the manipulation of the two-space key does not bring the carriage to the exact point required, the single-space-key bar 57 may then be operated.

My invention is applicable to machines of other designs, and many changes may be made in the form and disposition of the parts without departing from the gist thereof.

What I claim as new, and desire to secure by Letters Patent, is as follows:

1. In a type-writing machine, the combination of a carriage, a series of banks of type-operating keys, a series of transversely-arranged bars, one bar behind each of said banks, a single-spacing mechanism for said carriage controlled by said type-keys, and a double-spacing device controlled partially by said keys and partially by said transverse bars, said double-spacing device being idle except when a type key and bar are struck simultaneously.

2. In a type-writing machine, the combination of a carriage, a series of banks of type-operating keys, a series of transversely-arranged bars, one bar behind each of said banks, a single-spacing mechanism for said carriage controlled by said type-keys, a double-spacing device controlled partially by said keys and partially by said transverse bars, said double-spacing device being idle except when a key and bar are struck simultaneously, said transverse bars being mounted upon a pivoted frame which also carries a space-bar arranged transversely at the front of the keyboard.

3. In a type-writing machine, the combination with a carriage, of a letter-spacing mechanism including a feeding-dog having a variable throw, a type-operating key and a space-key connected to said feeding mechanism, and a movable stop limiting the throw of said feeding-dog and controlled partially by said type-operating key and partially by said space-key, so that by a simultaneous operation of the type-operating key and the space-key, said stop is moved and said dog is enabled to cause a double feed of the carriage.

4. In a type-writing machine, the combination of a carriage, a single-spacing mechanism therefor, a series of type-operating keys and a space-key connected to said spacing mechanism, means controlled partially by the type-operating keys and partially by the space-key for causing a double feed of the carriage, so that when a type-operating key is operated simultaneously with the space-key, the carriage is caused to feed a double space, and an independently-operable key for wholly controlling said double-spacing mechanism.

5. In a type-writing machine, the combination with a carriage and an escapement mechanism therefor, of a series of type-operating keys connected to said escapement mechanism, a frame adapted to move idly at the operation of any of said type-keys, a double-spacing mechanism for said carriage connected to said idle frame, and a key arranged at the keyboard and adapted to coöperate at will with any of said type-keys to cause said idle frame to operate said double-spacing mechanism so as to cause the carriage to move a double space.

6. In a type-writing machine, the combination with a carriage and a letter-spacing mechanism therefor, of a series of type-operating levers, a frame pivoted upon a movable support below said levers and adapted to rock idly at the operation of any of said levers, a double-space mechanism connected to said movable support, and an independent lever extending to the keyboard and provided with a key and adapted to coöperate with any of said type-operating levers to move said support, through said idle frame, and thereby cause the double-spacing mechanism to operate.

7. In a type-writing machine, the combination with a carriage of a letter-spacing mechanism therefor, a series of type-operating levers connected to said letter-spacing mechanism, a pair of space-key levers united at their forward ends by a space-key bar, an idle frame mounted upon a movable support and extending transversely beneath all of said levers and adapted to move idly in one direction at the operation of any type-operating lever, and to move idly in the opposite direction at the operation of said space-key bar, and also adapted to move bodily, together with said movable support, at the simultaneous operation of said space-key bar and any of said type-operating levers, and means connected to said movable support for causing a double-space movement of the carriage.

8. In a type-writing machine, the combination with a carriage of an escapement mechanism therefor, a series of key-levers connected to a series of type-bars, a space-key frame comprising a pair of levers extending parallel with said key-levers and united at their forward ends by a space-key bar, a series of U-frames extending from one of said space-key levers to the other, each U-frame being arranged behind a bank of keys, an idle frame pivoted upon a movable support below all of said levers and adapted to rock in one direction at the operation of any of said type-key levers and to rock in the opposite direction at the operation of said space-key frame, and also adapted to move bodily downward together with said movable support at the simultaneous operation of said spacing-frame and any selected type-key lever, and a double-spacing mechanism connected to said movable support.

9. In a type-writing machine, the combination of a pivoted frame comprising parallel levers 51, united by transverse shaft 48, an idle frame pivoted upon said shaft and comprising cross-bars 53 united by tie-rods 54, 55, the construction and arrangement being such that said frame rocks idly during the usual operation of the machine, means for moving said idle frame bodily together with said shaft 48 and levers 51, link 47 connected to said shaft 48, and means connected to said link for causing a double feed of the paper-carriage.

10. In a type-writing machine, the combination with a paper-carriage and an escapement mechanism therefor, of a series of type-operating key-levers, a pair of space-key levers extending parallel with said type-key levers, an idle frame arranged below all of said levers and comprising cross-bars 53 united by tie-rods 54, 55, shaft 48 on which said cross-bars are pivoted, pivoted levers 51 upon which said shaft 48 is supported, projections 59 formed upon each of said space-key levers and adapted to move one of said tie-rods 54, notch 60 formed in each of said space-key levers, to leave a clearance for the other of said tie-rods 55, and a double-spacing mechanism connected to said shaft 48, the construction and arrangement being such that at the operation of any type-key lever, the tie-rod 55 is depressed and the bars 53 rock idly upon the shaft 48 in one direction, and such that when the space-key frame is depressed, the projections 59 contact with the other tie-rod 54 and cause said bars 53 to rock idly upon the shaft 48 in the other direction, and being also such that at the simultaneous operation of said space-key and any of said type-keys, both of said tie-rods 54, 55 are forced down simultaneously, carrying down said shaft 48, and causing the double-spacing mechanism connected thereto to operate.

11. In a type-writing machine, the combination with a carriage, of an escapement-rack, a dog-rocker, a feeding-dog independently movable upon said rocker, a movable stop for limiting the independent movement of said dog, a series of type-operating keys arranged in banks and connected to said dog-rocker, a bar arranged transversely behind each of said banks of keys, and means called into action by the simultaneous operation of any of said type-keys and its associated transverse bar for moving said movable stop out of the path of the independent movement of said feeding-dog and thereby enabling said dog to move to a position for causing a double feeding of the carriage.

12. In a type-writing machine, the combination with a carriage, of an escapement-rack, a dog-rocker, a feeding-dog independently movable upon said rocker, a movable stop for limiting the independent movement of said dog, a series of type-operating keys, a space-key, all of said keys being operatively connected to said dog-rocker, and the construction and arrangement being such that at the operation of the space-key or any type-key, said feeding-dog contacts with said movable stop and causes a single feed of the carriage, and means called into action by the simultaneous operation of said space-key and any of said type-keys for moving said movable stop out of the path of the independent movement of said feeding-dog and thereby enabling said dog to move to a position for causing a double feed of the carriage.

13. In a type-writing machine, the combination with a carriage, of an escapement-rack, a dog-rocker, a feeding-dog independently movable upon said rocker, a movable stop for limiting the independent movement of said dog, a space-key frame operatively connected to said rocker and normally adapted to move said dog-rocker but not to move said movable stop, and means adapted to coact at will with said space-key frame at the operation of said dog-rocker, so as to cause said movable stop to be moved out of the path of the independent movement of said feeding-dog and thereby enabling said dog to move to a position for causing a double feed of the carriage.

14. In a type-writing machine, the combination with a carriage, of an escapement-rack, a dog-rocker, a feeding-dog independently movable upon said rocker, a movable stop for limiting the independent movement of said dog, a series of type-operating keys connected to said dog-rocker, a frame connected to said movable stop and adapted to move idly at the operation of any of said type-keys, and a device arranged at the keyboard and adapted to coöperate at will with any of said type-keys to cause said idle frame to move said movable stop out of the path of the independent movement of said feeding-dog and thereby enable said dog to move to a position for causing a double feed of the carriage.

15. In a type-writing machine, the combination with a carriage, of an escapement-rack, a dog-rocker, a feeding-dog independently movable upon said rocker, a movable stop for limiting the independent movement of said dog, a series of type-operating levers, a universal bar connected to said dog-rocker and adapted to be operated by any of said levers, a pair of space-key levers united at their forward ends by a space-key bar, an idle frame mounted upon a movable support and extending transversely beneath all of said levers and adapted to move idly in one direction at the operation of any type-operating lever and to move idly in the opposite direction at the operation of said space-key levers, and also adapted to move bodily, together with its said movable support, at the simultaneous operation of said space-key bar and any of said type-operating levers, and a connection from said movable support to said movable stop, whereby the latter is moved out of the path of the movement of said independent feeding-dog and thereby enables the said feeding-dog to move to a position for causing a double feed of the carriage.

Signed at the borough of Manhattan, city of New York, in the county of New York and State of New York, this 19th day of April, A. D. 1900.

BYRON A. BROOKS.

Witnesses:
K. V. DONOVAN,
FLORENCE KEELING.